(12) United States Patent
Leighton et al.

(10) Patent No.: US 9,262,484 B2
(45) Date of Patent: Feb. 16, 2016

(54) METHOD FOR IDENTIFYING NETWORK SIMILARITY BY MATCHING NEIGHBORHOOD TOPOLOGY

(71) Applicants: Bonnie Berger Leighton, Newtonville, MA (US); Rohit Singh, Jersey City, NJ (US)

(72) Inventors: Bonnie Berger Leighton, Newtonville, MA (US); Rohit Singh, Jersey City, NJ (US)

( * ) Notice: Subject to any disclaimer, the term of this patent is extended or adjusted under 35 U.S.C. 154(b) by 0 days.

(21) Appl. No.: 14/158,936

(22) Filed: Jan. 20, 2014

(65) Prior Publication Data

US 2014/0337365 A1 Nov. 13, 2014

Related U.S. Application Data

(60) Division of application No. 13/209,983, filed on Aug. 15, 2011, now Pat. No. 8,634,427, which is a continuation of application No. 12/105,815, filed on Apr. 18, 2008, now Pat. No. 8,000,262.

(51) Int. Cl.
*H04W 4/02* (2009.01)
*G06F 17/30* (2006.01)
*H04L 12/24* (2006.01)

(52) U.S. Cl.
CPC ...... *G06F 17/3053* (2013.01); *G06F 17/30958* (2013.01); *H04L 41/12* (2013.01); *Y10S 707/99932* (2013.01)

(58) Field of Classification Search
CPC combination set(s) only.
See application file for complete search history.

(56) References Cited

U.S. PATENT DOCUMENTS

| 8,000,262 | B2 * | 8/2011 | Leighton et al. | 370/254 |
| 2005/0192758 | A1 * | 9/2005 | Xie | 702/19 |
| 2009/0262664 | A1 * | 10/2009 | Leighton et al. | 370/254 |
| 2011/0302127 | A1 * | 12/2011 | Leighton et al. | 706/52 |
| 2014/0337365 | A1 * | 11/2014 | Leighton et al. | 707/758 |

\* cited by examiner

*Primary Examiner* — Fan Ng
(74) *Attorney, Agent, or Firm* — David H. Judson

(57) ABSTRACT

A similarity measure is computed between nodes of first and second networks. Sets of pairwise scores are computed to find nodes in the individual networks that are good matches to one another. A pairwise score is computed for a node i in the first network and a node j in the second network. Similar pairwise scores are computed for each of the nodes in each network. The process identifies node pairs that exhibit high pairwise values. Preferably, nodes i and j are a good match if their neighbors are a good match. This technique produces a measure of network similarity. If node feature data is available, nodes i and j are considered a good match if their neighbors are a good match (network similarity) and their node features are a good match (node similarity). Using the similarity scores, a common subgraph between the first and second networks is computed.

7 Claims, 4 Drawing Sheets

METHOD FOR IDENTIFYING NETWORK SIMILARITY BY MATCHING NEIGHBORHOOD TOPOLOGY

TECHNICAL FIELD

The present invention relates generally to network graph matching.

BACKGROUND OF THE RELATED ART

The network alignment problem in graph matching is well-known. Each input network can be represented as a graph G=(V, E) where V is a set of nodes and E is a set of edges. Further, G may be a weighted graph, i.e., a confidence measure w(e) may be associated with each edge e in E. The graphs may have arbitrary structure. The goal in network alignment is to identify one or more possible mappings between the nodes of the input networks and, for each mapping, the corresponding set of conserved edges. Mappings may be partial, i.e., they need not be defined for all the nodes in the networks. Each mapping implies a common subgraph between the two networks; when node $a_1$ from network $G_1$ is mapped to node $a_2$ from network $G_2$, then $a_1$ and $a_2$ refer to the same node in the common subgraph; the edges in the common subgraph correspond to the conserved edges.

A classic problem of graph isomorphism is determining whether one graph can be exactly mapped onto a second. Another known problem is determining a maximum common subgraph, where the goal is to discover the largest graph that is isomorphic to some subgraph in both the networks. Both these problems typically look only at undirected, unweighted, and unannotated graphs. A related but different graph matching problem arises where graphs have edge weights and hence an exact match may not be desired. The matching problem is also complicated when graphs include node feature scores that are used to find a mapping between the nodes, as those scores may not correspond to a maximum common subgraph yet still are appropriate for the given domain.

BRIEF SUMMARY

The subject matter herein describes a method of computing a measure of similarity between nodes of first and second networks. In particular, sets of pairwise scores are computed to find nodes in the individual networks that are good matches to one another. Thus, a pairwise score, referred to as $R_{ij}$, is computed for a node i in the first network and a node j in the second network. Similar pairwise scores are computed for every pair of nodes from the two networks. The goal of this process is to identify (i.e. locate) node pairs that exhibit high $R_{ij}$ values. According to the technique described herein, the intuition is that nodes i and j are a good match if their neighbors are a good match. This technique produces a measure of "network similarity." If node feature data also is available, the intuition may be expanded such that nodes i and j are considered a good match if their neighbors are a good match (network similarity) and their node features are a good match (node similarity). Node feature data typically is domain-specific. Using the similarity scores, a common subgraph between the first and second networks then can be computed.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
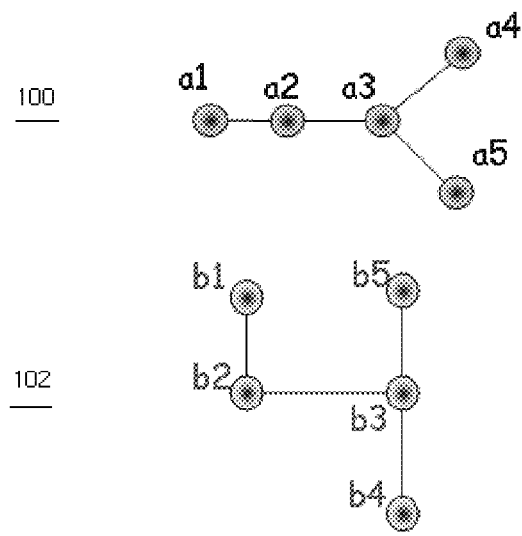
FIG. 1 illustrates a pair of undirected networks.

By way of background, FIG. 1 illustrates a pair of undirected networks, a first network 100 and a second network 102. The first network comprises a set of nodes a1, a2, a3, a4 and a5. The second network comprises nodes b1, b2, b3, b4 and b5. In the first network 100, node a1 is connected to node a2, and node a2 is connected to both node a1 and a3; node a3 has three nodes connected to it, namely nodes a2, a4, and a5. Thus, with respect to node a3, it can be said that node a3 supports (or has support from) three (3) other nodes (a2, a4 and a5). In a similar manner, in network 102, node b1 (for example) has support from one node (b2) while node b3 supports (or has support from) three nodes, namely nodes b2, b4 and b5. The line between each node represents an "edge" between a pair of nodes in the network, and this edge may have a "weight." Typically, a weight has a value between zero and one. In the illustrative examples here, the weights are "1" and thus are omitted for clarity.

Of course, these network topologies are merely exemplary, and a given network may be much more complex, with many more nodes and edges. Using convenient notation, however, it can be said that the first network $G_1$ has a set of nodes $V_1$ and a set of edges $E_1$. Likewise, the second network $G_2$ has a set of nodes $V_2$ and a set of edges $E_2$. Moreover, for any node a in either network, N(a) is a set of neighbors of that node a. The set is of size |N(a)|. Further, as noted above, each edge e of a network has an edge weight w(e), where 0<w(e)≤1. Using the example in FIG. 1, network 100 has a set of nodes $V_1$ {a1, a2, a3, a4, a5} and a set of edges $E_1$ {a1-a2, a2-a3, a3-a4, a3-a5}. For a given node a3 and unitary edge weights, for example, the set of neighbors corresponds to N(a){a2, a3 and a5} and the absolute value |N(a)| of the support provided to node a3 is then 3.

Figure 2:
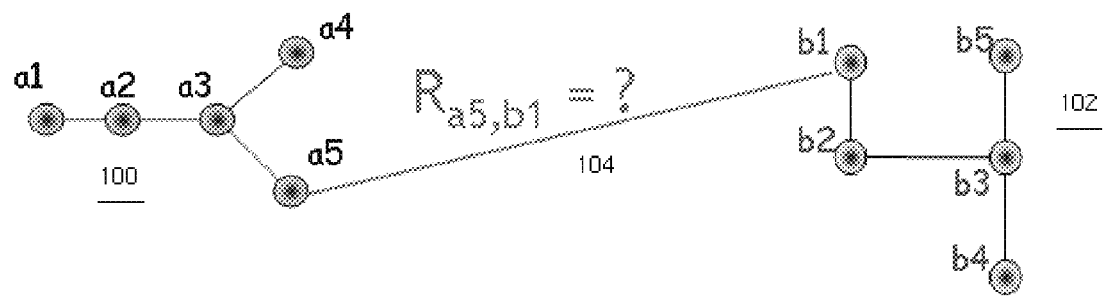
FIG. 2 illustrates the calculation of a similarity score $R_{ij}$ across a pair of nodes in the networks of FIG. 1.

With the above as background, FIG. 2 illustrates a fundamental intuition of the subject matter of this disclosure. In particular, to facilitate graph matching between the first and second networks, sets of pairwise scores are computed to find nodes in the individual networks that are good matches to one another. Thus, as seen in FIG. 2, a pairwise score 104, referred to as $R_{ij}$, is computed for, say, node a5 in network 100 with respect to node b1 in network 102. Similar pairwise scores are computed for each of the nodes in each network. The goal of this process is to identify (i.e. locate) node pairs that exhibit high $R_{ij}$ values. According to the technique described herein, the intuition is that nodes i and j are a good match if their neighbors are a good match. This technique produces a measure of "network similarity." In another embodiment and, in particular where node feature data also is available, the intuition may be expanded such that nodes i and j are considered a good match if their neighbors are a good match (network similarity) and their node features are a good match (node similarity). Node feature data typically is domain-specific. Thus, for example in the realm of comparative genomics the first and second networks may each comprise protein interaction networks, in which case the node feature data may be protein sequence (the feature similarity here is the sequence similarity between the two proteins). The $R_{ij}$ score (whether based on network similarity alone or both network similarity and node feature similarity) is sometimes referred to herein as a functional similarity score.

The following provides additional detail about how the $R_{ij}$ values are calculated to generate the network similarity scores according to a preferred embodiment. For convenience, the following describes the case where node similarity data is not available, not used, or otherwise not of interest. Using convenient nomenclature, given the first and second networks previously described, assume a set of node pairs (i, j), where i is a node from the first network and j is a node from the second network, and where u is a neighbor of i and v is a neighbor of j. Then, with unitary edge weights (i.e. w(e)=1), calculate $R_{ij}$ as follows:

$$R_{ij} = \Sigma_{u \in N(i)} \Sigma_{v \in N(j)} [1/(|N(u)||N(v)|)] R_{uv} \quad (1)$$

As can be seen, the score $R_{ij}$ is equal to the sum of the support the node pair receives from the pairing of all the neighbors of node i with those of node j. In return, each pairing preferably must distribute its score equally between preferably all the pairings it needs to support, hence the $1/(|N(u)||N(v)|)$ term with $R_{uv}$. This approach is best explained by several example calculations, which are now described with respect to FIGS. 3 and 4.

Figure 3:
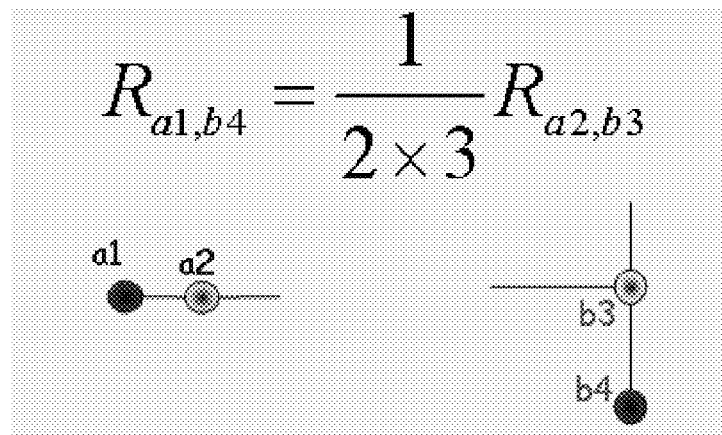
FIG. 3 illustrates how the similarity score is calculated for a first pair of nodes in the networks.

Thus, FIG. 3 illustrates a pairing of nodes a1 and b4, using unitary edge weights for convenience. Both have one neighbor, nodes a2 and b3, respectively. So, with respect to this node pair, $R_{a1,b4}$ depends only on $R_{a2,b3}$. Now, neighbor a2 receives support from two other nodes (a1 and a3) and neighbor b3 receives support from three other nodes (b2, b4 and b5); equation (1) generates the following value for this particular node pair: $R_{a1,b4}=1/(2\times3)R_{a2,b3}$. This is another way of saying that because a2 must support 2 neighbors and b3 must support 3 neighbors, $R_{a2,b3}$ only gives $1/(2\times3)$ of its support to $R_{a1,b4}$.

Figure 4:
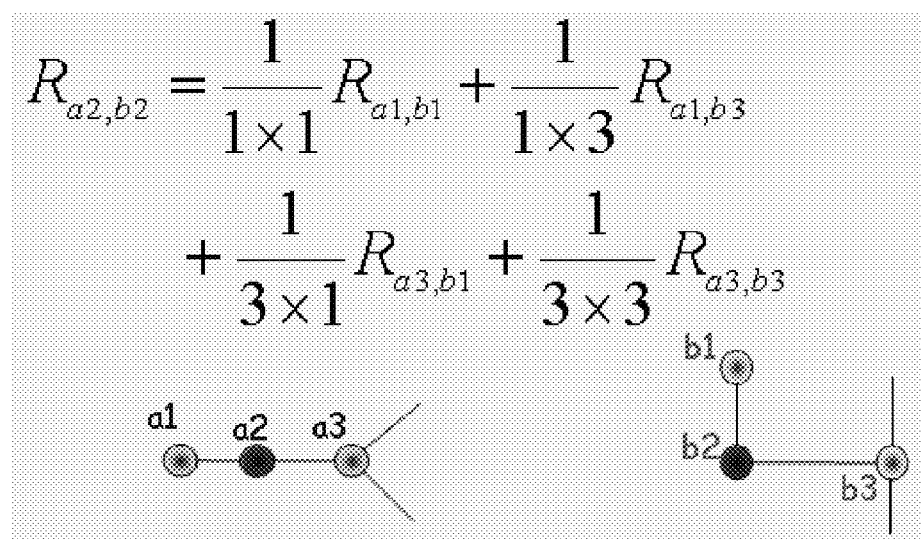
FIG. 4 illustrates how the similarity score is calculated for a second pair of nodes in the networks.

FIG. 4 illustrates a next pair of nodes, a2 and b2. This case is more complex, as node a2 has two neighbors (a1 and a3), as does node b2 (i.e. b1 and b3). Thus, there are four (4) combinations that need to be calculated, as indicated in the drawing. As can be seen, $R_{a2,b2}$ gets $1/(1\times1)$ of its support from $R_{a1,b1}$, $1/(1\times3)$ of its support from $R_{a1,b3}$, $1/(3\times1)$ of its support from $R_{a3,b1}$, and $1/(3\times3)$ of its support from $R_{a3,b3}$.

Generalizing, network similarity $R_{ij}$ for a node pair preferably is the total support provided by all pairs adjacent to it, each supporting node pair providing its support in proportion to the number of node pairs it has to support.

Figure 5:
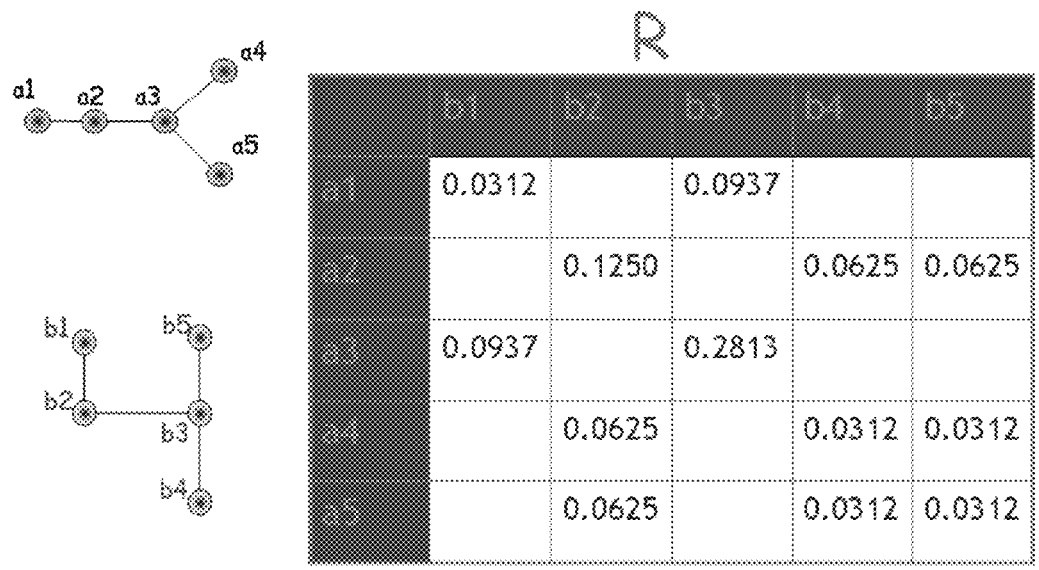
FIG. 5 illustrates a non-trivial solution of the $R_{ij}$ scores.

Each of the $R_{ij}$ values is computed in a similar manner for each of the node pairs in the networks. The $R_{ij}$ values then comprise a set of constraints that are required to hold for all possible pairs. Many of the values will be zero. A non-trivial solution to these constraints is then shown in FIG. 5 as a table of R values. As noted above, a goal is to locate high functional similarity scores. FIG. 5 illustrates what a non-trivial solution to the set of computed $R_{ij}$ values may look like in the described embodiment. Here, it can be seen that the best score for a3 and also for b3 corresponds to matching a3-b3, which is a correct match. The same can be said for node pair a2-b2. As the graphs here are isomorphic, it should be expected that the diagonal in the table provides a good score.

Thus, according to equation (1) above, and for each set of node pairs (i, j), where i is a node from the first network and j is a node from the second network, and where u is a neighbor of i and v is a neighbor of j, a similarity score $R_{i,j}$ is computed to be equal to a support value provided to the node pair (i, j) by $|N(i)||N(j)|$ possible matches between neighbors of i and j, where each neighboring node pair (u,v) distributes back its score $R_{uv}$ among $|N(u)||N(v)|$ possible matches between neighbors of u and v. In one embodiment, the support value is a total support value provided to the node pair by each of the $|N(i)||N(j)|$ possible matches between neighbors of i and j. In another embodiment, the support value is a maximum support value provided to the node pair by any of the $|N(i)||N(j)|$ possible matches between neighbors of i and j. In both cases, the edge weight w(e) of each edge e is equal to 1, as has been described.

For ease of explanation, the above example focuses on the network-only data case (i.e. where node similarity is not considered). As has been described, the intuition is to set up a system of constraints, where the neighborhood scores are computed in a recursive fashion. These equations require that the score $R_{ij}$ for any match (ij) be equal to the total support provided to it by each of the $|N(i)||N(j)|$ possible matches between the neighbors of i and j. In return, each node-pair (u,v) distributes back its entire score $R_{uv}$ equally among the $|N(u)||N(v)|$ possible matches between its neighbors. These equations also capture non-local influences on $R_{ij}$: the score $R_{ij}$ depends on the score of neighbors of i and j and the latter, in turn, depend on the neighbors of the neighbors, and so on.

The extension to the weighted-graph case is intuitive; the support offered to neighbors is then in proportion to the edge weights, as seen in equation (2) below:

$$R_{ij} = \Sigma_{u \in N(i)} \Sigma_{v \in N(j)} [w(i,u)w(j,v)/(\Sigma_{r \in N(i)} w(r,u) \Sigma_{q \in N(j)} w(q,v))] R_{uv} \quad (2)$$

Clearly, equation (1) is a special case of equation (2) when all the edge weights are 1.

Equation (1) can be rewritten in matrix form (equation (2) can be similarly rewritten):

$$R = AR \quad (3)$$

$$A[i,j][u,v] = \begin{cases} \frac{1}{|N(u)||N(v)|} & \text{if } (i,u) \in E_1 \text{ and } (j,v) \in E_2 \\ 0 & \text{otherwise} \end{cases}$$

where A is a $|V_1||V_2| \times |V_1||V_2|$ matrix and $A[i,j][u,v]$ is an entry at row (i,j) and column (u,v) of the matrix. Thus, the row and the column are doubly-indexed. The above is equation (3).

Figure 6:
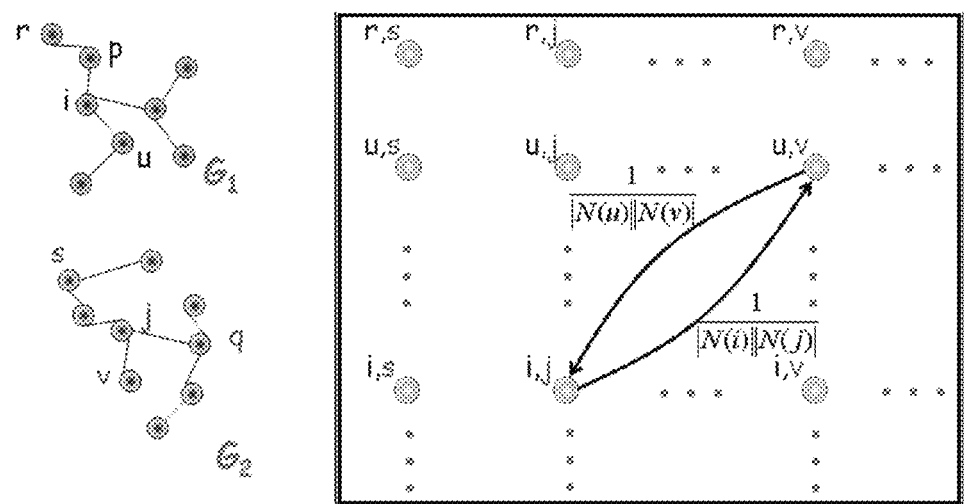
FIG. 6 illustrates how the solution can be visualized as an eigenvalue problem.

Another interpretation of the above equations is that they describe a random walk on $G^*$, a tensor product graph of $G_1$ and $G_2$. Each node $\{ij\}$ in $G^*$ corresponds to a pair of nodes from $G_1$ and $G_2$, with i from $G_1$ and j from $G_2$. An edge $\{ij\}$-$\{uv\}$ exists in $G^*$ if and only if edges i-u and j-v exist in $G_1$ and $G_2$, respectively. Also, if $G_1$ and $G_2$ are weighted, so is $G^*$: $w(\{ij\},\{uv\})=w(i,u)w(j,v)$. This solution is illustrated in FIG. 6. The following specifies a random walk among the nodes of $G^*$: from any node one can move to one of its neighbors, with a probability proportional to the edge weight (equation (4)):

$$P(\{ij\} \rightarrow \{uv\}) = w(i,u)w(j,v)/[\Sigma_{r \in N(i)} w(r,u) \Sigma_{q \in N(j)} w(q,v)]$$

where [ij] is the node occupied in G* at time t and {uv} is the node occupied at time t+1. The previous equations can now be interpreted as defining R to be the stationary distribution of this random walk (its transition matrix is A). Thus, a high $R_{ij}$ implies that the node {i,j} of G* has a high probability of being occupied in the stationary distribution.

The vector R is determined by finding a non-trivial solution to these equations (a trivial solution is to set all $R_{ij}$s to zero).

In general, to solve the above equations, it should be observed that these equations describe an eigenvalue problem. The value of R that is of primary interest is the principal eigenvector of A. Note that A is a stochastic matrix (i.e. each of its columns sums to 1) so that the principal eigenvalue is 1. In most use-cases, however, A and R are both very sparse, so R can be efficiently computed by iterative techniques. In one embodiment, the power method, an iterative technique often used for large eigenvalue problems, is used. The power method repeatedly updates R as per the update rule (equation (5)):

$$R(k+1) \leftarrow AR(k)/|AR(k)|$$

where R(k) is the value of the vector R in the k-th iteration and has unit norm. In the case of a stochastic matrix (like A), the power method provably converges to the principal eigenvector.

Figure 7:
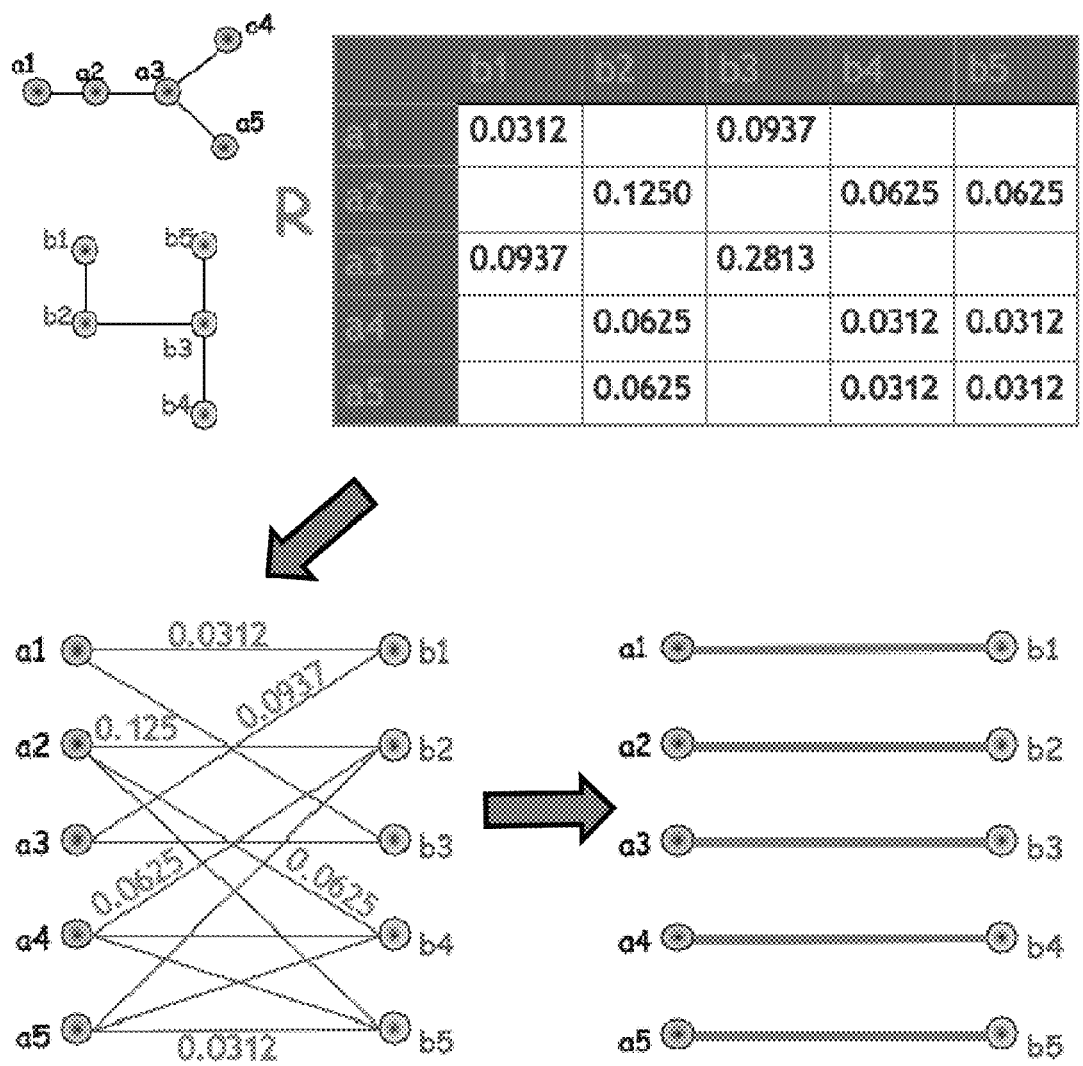
FIG. 7 illustrates how a bipartite graph may be used in one embodiment to identify one-to-one node mappings across the networks.

Once R has been computed, the node mappings can be extracted from it. One approach is to extract the set of mutually-consistent pairwise matches (p,q) such that the sum of their scores is maximized. An optimal solution thus can be found efficiently by interpreting R as encoding a bipartite graph and finding a maximum-weight bipartite matching for this graph. Each side of the bipartite graph contains all the nodes from one network, and the weight of each edge (i,j) is then set to $R_{ij}$. This approach is illustrated in FIG. 7. Then, compute the maximum-weight matching in this bipartite graph and output the paired nodes. Any remaining unpaired nodes are designated as gap nodes. This algorithm guarantees the set of matches that satisfy the desired criterion.

While the above-described algorithm is provably optimal for extracting mutually-consistent high-scoring matches, in practice the following greedy algorithm may provide results more appropriate for the domain of interest. This approach begins by identifying the highest score $R_{pq}$ and outputting this pairing (p,q). Then, the algorithm removes all scores involving p or q. The process is then repeated until the list is empty. In the bipartite graph, this strategy corresponds to removing, at each step, the maximum weight edge and the incident nodes. Once the node mappings are extracted, the corresponding subgraph can be created by identifying consensus edges. A consensus edge between two node pairs is one for which some function of their edge weights exceeds a threshold (e.g., an indicator function for both edges present). The determination of whether an edge is a consensus edge may be based on other known criteria.

As described above, it may be desirable to incorporate node feature data into the functional similarity score. The node feature data typically is domain-specific. The feature data can be further refined or filtered in a problem-specific way, to emphasize certain aspects. In general, let $B_{ij}$ denote the node feature score between i and j. $B_{ij}$s need not even be numeric; they can be binary. Let B be the vector of $B_{ij}$ s. First, normalize B: $E=B/|B|_1$ so that all sequence similarity scores sum to 1. The eigenvalue equation is then modified to a convex combination of network and node feature similarity scores (equation (6)):

$$R = \alpha AR + (1-\alpha)E, \ 0 \leq \alpha \leq 1, \text{ or}$$

$$R = +(\alpha A + (1-\alpha)E1^T)R$$

Equation (6) also describes an eigenvalue problem and is solved by similar techniques as Equation (3) above (here, use $|R|_1=1$). In this computation, $\alpha$ controls the weight of the network data (relative to the node feature data), e.g., $\alpha=0$ implies no network data will be used, while $\alpha=1$ indicates only network data will be used. Tuning $\alpha$ enables analysis of the relative importance of the node feature data. The parameter $\alpha$ also controls the speed of convergence of this stage, with the algorithm converging in $O(\log(1/(1-\alpha))$ iterations.

The first and second networks typically are each undirected and may represent any physical system or construct. As noted above, in comparative genomics it is well-known to study protein interactions using protein interaction networks, which are representational models of proteins. In a protein interaction network, a node of the network corresponds to a protein and an edge of the network corresponds to an interaction between proteins. The subject matter herein can be used to compare protein interaction networks. In the realm of structural biology, a protein can be represented as a network, with individual atoms or amino acids corresponding to nodes and edges representing a chemical bond between two atoms or amino acids. The subject matter herein can be used to compare protein structures. In another example, the realm of information technology, the networks may correspond to given information content, and the described algorithm can be used to derive relevant similarity measurements for various purposes, such as to drive search engine technologies. In one example of this approach, first and second networks each represent a set of web pages, with a node corresponding to a web page and an edge corresponding to a link between web pages. Or, the first and second networks each represent a web page, with a node corresponding to a portion of a web page and an edge corresponding to a link between web page portions. More generally, the first and second networks can represent any kind of linked databases, such as any database of documents containing citations or the like. Of course, the World Wide Web (or any other hypermedia database) is one such linked distributed database, and thus the disclosed algorithm also is useful in semantic web applications and the like. Another realm of interest is image processing, where it is desired to determine the degree of similarity of, say, a pair of digital images. In this example, the first and second networks each represent a digital image, with the nodes corresponding to features within an image and the edges corresponding to the spatial relationship of these features. The above examples, of course, are merely representative use cases for the described graph matching techniques.

Variants

While the discussion and examples have involved undirected graphs, this is not a limitation. The subject matter herein applies as well to directed graphs.

Moreover, while the graph matching technique has been described in the context of first and second networks, the techniques can be applied to the multiple network case. In particular, given multiple networks, the R scores are computed for every pair of networks in the manner described above. Given these R scores, the method then finds a set of nodes, one or more from each network. Given these scores (for these nodes), a graph is then constructed of all the nodes from all the networks; each pair of nodes (i,j) connected by an edge if the corresponding score $R_{ij}$ is non-zero. The edge is assigned the weight $R_{ij}$. The routine then searches for sets of nodes, one (or more) from each network, such that each node in the set is connected to most of the other nodes in the set with edges of high score. A greedy algorithm (as just one example) can then be used to construct a multiple alignment from pairwise alignments.

The disclosed method may be implemented in a computer that includes a processor and program instructions (or their equivalent logic) executable by the processor to provide the described calculations required by the algorithm. One example embodiment is a computer program product comprising a computer-readable storage medium on which processor-executable instructions are encoded for performing the various methods.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A computer program product comprising a non-transitory tangible machine-readable medium that stores a program, the program being executable by a machine to perform a method of identifying a common subgraph between first and second networks, the first network $G_1$ having a set of nodes $V_1$ and a set of edges $E_1$, the second network $G_2$ having a set of nodes $V_2$ and a set of edges $E_2$, where N(a) is a set of neighbors of a given node a, the set being of size $|N(a)|$, with each edge e of a network having an edge weight w(e), the method comprising:

for each of a set of node pairs (i, j), where i is a node from the first network and j is a node from the second network, and where u is a neighbor of i and v is a neighbor of j, computing a similarity score;

selecting from the similarity scores a set of scores that capture mutually-consistent pairwise matches; and extracting node mappings from the set of scores to identify one or more conserved edges between the first and second network.

2. The computer program product as described in claim 1 wherein the similarity score $R_{i,j}$ is derived according to the following equation:

$$R_{ij} = \Sigma_{u \in N(i)} \Sigma_{v \in N(j)} [1/(|N(u)||N(v)|)] R_{uv}, \text{ where } i \in V_1 \text{ and } j \in V_2.$$

3. The computer program product as described in claim 2 wherein the edge weight w(e) of each edge e is equal to 1.

4. The computer program product as described in claim 1 where the first and second networks are each a protein interaction network having a node corresponding to a protein and an edge corresponding to an interaction between proteins.

5. The computer program product as described in claim 1 where the first and second networks each represent a set of web pages, with a node corresponding to a web page and an edge corresponding to a link between web pages.

6. The computer program product as described in claim 1 where the first and second networks each represent a web page, with a node corresponding to a portion of a web page and an edge corresponding to a link between web page portions.

7. The computer program product as described in claim 1 where the first and second networks each represent a digital image, with a node corresponding to a feature within an image and an edge corresponding to a spatial relationship of the feature.

* * * * *